United States Patent Office 3,801,645
Patented Apr. 2, 1974

---

3,801,645
CHLORINATION OF LOWER ALIPHATIC ALDEHYDES
David Alan Dalman, Midland, Mich., assignor to The Dow Chemical Company, Midland, Mich.
No Drawing. Filed Aug. 10, 1970, Ser. No. 62,664
Int. Cl. C07c 47/14
U.S. Cl. 260—601 H
4 Claims

ABSTRACT OF THE DISCLOSURE

Propionaldehyde, butyraldehyde and valeraldehyde are chlorinated to form the $\alpha,\alpha$-dichloroaldehyde by the use of sulfuryl chloride in the presence of a catalyst of diphenyl sulfide.

BACKGROUND OF THE INVENTION

Chlorination of acetaldehyde in aqueous acid gave 2,2-dichloroacetaldehyde in 85% yield as described by Guinot et al. in Compt. Rend., 231, 234 (1950). In a very similar manner, Krattiger in Bul. Soc. Chim. France, 222 (1953) prepared 2-chlorobutyraldehyde in 70% yields, and Dick in J. Org. Chem. 27, 272 (1962) reacted propionaldehyde to give a 35% yield of 2-chloropropionaldehyde and a 10% yield of 2,2-dichloropropionaldehyde. Eventually Dick was able to improve the yield of each to 85% but separation of the free aldehyde from the aqueous mixture was difficult.

Aldehydes have been chlorinated with sulfuryl chloride as described by Backes in Compt. Rend., 196, 1674 (1933) to give an aldol condensation. Wyman et al. in J. Org. Chem. 29, 2706 (1954) chlorinated aldehydes with sulfuryl chloride in the presence of anhydrous sodium carbonate to give very low yields of $\alpha$-chloroaldehydes along with polymers formed by acid catalyzed polymerization. Brown et al. in J. Am. Chem. Soc. 77, 4019 (1955) was able to prepare 2-chlorobutyraldehyde in 79% yields from sulfuryl chloride and butyraldehyde in a methylene chloride solvent with the use of distillation solvents.

None of such methods is desirable for commercially preparing $\alpha,\alpha$-dichloroaldehydes. Therefore, a commercially feasible method of preparing these useful compounds has been sought.

SUMMARY OF THE INVENTION

According to the present invention, propionaldehyde, butyraldehyde, valeraldehyde or mixtures thereof are chlorinated to the corresponding $\alpha,\alpha$-dichloroaldehyde by reaction with sulfuryl chloride in the presence of diphenyl sulfide in an organic reaction medium. The reaction is conducted in a liquid phase and gives a product in high yield which is easily separated from the reaction mixture.

The reactants and catalysts of the invention are all well known. Since the reaction is a dichlorination, two moles of sulfuryl chloride or more are employed per mole of the aldehyde to permit the dichlorination of the aldehyde. It has been found that when sulfuryl chloride is added to the aldehyde about 2 moles of the sulfuryl chloride are required, whereas if the aldehyde is added to the sulfuryl chloride about 2.5 moles of sulfuryl chloride should be employed per mole of the aldehyde. Of course, large excesses of the sulfuryl chloride should be avoided because of the waste of reactant and possible reactions which would give undesirable by-products.

As noted above, the catalyst is diphenyl sulfide. The amount of catalyst may vary widely for any catalytic amount may be employed. Suitably, the amount of catalyst is about 0.1 to about 10 weight percent or more based on the aldehyde, with about 1 to 5 percent being preferred.

An important reaction condition of the present invention is the temperature. The temperature is adjusted in connection with the pressure to maintain the liquid phase. Preferably the sulfuryl chloride is added to the aldehyde at a temperature of about 25° to 40° C. in order to avoid the build up of unreacted sulfuryl chloride which could react violently. After the introduction of the sulfuryl chloride, the temperature may be increased to about 60° to about 90° C. or preferably 65° to 80° C. to increase the rate of reaction. At the time the temperature is raised, almost all of the aldehyde has been monochlorinated. Pressure is used at elevated temperatures to maintain the liquid phase.

The reaction is conducted in an organic medium which is preferably created by the addition of an inert solvent although excess aldehyde could be used. Representative examples of suitable inert solvents include halogenated aliphatic hydrocarbons, such as methylene chloride, chloroform, carbon tetrachloride and methylene bromide, halogenated aromatic compounds, such as mono- and di-halobenzene and hydrocarbon solvents such as cyclohexane, petroleum ether and benzene. Such solvents are chosen because they are relatively inert to chlorination as compard to the aldehyde. Other solvents meeting this criterion could also be employed.

The reaction should be conducted in as short a time as necessary to obtain a desired conversion. This reaction time depends primarily upon the temperature although reactant ratios and reaction conditions are also important. Reaction times of about 30 minutes to about 4 hours are generaly sufficient to obtain the desired yield of the $\alpha,\alpha$-dichloroaldehyde.

The $\alpha,\alpha$-dichloroaldehydes are useful as hypnotics, herbicides and insecticides and soil fumigants. Thus, by the process of the present invention, a suitable and economic way of obtaining these $\alpha,\alpha$-dichloroaldehydes has been discovered.

SPECIFIC EMBODIMENTS

Example 1.—Preparation of $\alpha,\alpha$-dichlorobutyraldehyde

To a reactor equipped with a water condenser, mechanical stirrer and dropping funnel was charged 72 g. (1.0 mole) of butyraldehyde, 30 ml. of methylene chloride and 2 g. (0.01 mole) of diphenyl sulfide. While the contents of the reactor were stirred at 30° C., 270 g. (2.0 moles) of sulfuryl chloride in 20 ml. of methylene chloride was added dropwise over a period of 2 hours. After complete addition of the sulfuryl chloride, the temperature was increased to 70° C. and held there for 2 hours. The crude product was cooled and a small lower layer of aqueous acid apparently formed from impurities in the system was removed. To the remaining organic layer, 15 ml. of 1,2-dichloroethane and 15 ml. of 1,1,2,2-tetrachloroethane were added and the solution was distilled at atmospheric pressure. The fraction with a boiling point of 105° to 115° C. was collected and analyzed. The sample weighed 109 g. and was analyzed by nuclear magnetic resonance spectroscopy to be 95% 2,2-dichlorobutyraldehyde, 2% 1,2-dichloroethane, 2% tetrachloroethane and 1% 2-chlorobutyraldehyde. Redistillation of this fraction gave pure 2,2-dichlorobutyraldehyde having a boiling point of 113° to 115° C. The total yield based upon the butyraldehyde reactant after one distillation was 71%.

Example 2.—Preparation of $\alpha,\alpha$-dichloropropionaldehyde

To a reactor equipped with a water condenser, mechanical stirrer and dropping funnel was charged 58 g. (1.0 mole) of propionaldehyde, 35 ml. of methylene chloride and 2 g. (0.01 mole) of diphenyl sulfide. While the contents of the reactor were stirred at 30°, 270 g. (2.0 moles)

of sulfuryl chloride in 15 ml. of methylene chloride was added dropwise over a period of 1.5 hours. After complete addition of the sulfuryl chloride, the temperature was increased to 60° and held there for 1.5 hours. Gasliquid chromatography analysis of the crude product indicated the product to consist of 2,2-dichloropropionaldehyde with about 5% 2-chloropropionaldehyde present. A small lower layer of aqueous acid was removed from the crude product. To the remaining organic layer, 20 ml. of 1,1,2,2-tetrachloroethane was added and the solution was distilled at atmospheric pressure. The product, B.P. 80–85°, 82 g., contained 2,2-dichloropropionaldehyde and a small amount of methylene chloride. Yield of 2,2-dichloropropionaldehyde was 65%.

In the same manner as described by the examples above, $\alpha,\alpha$-dichlorovaleraldehyde may be prepared by reacting valeraldehyde with sulfuryl chloride in the presence of diphenyl sulfide under conditions similar to those of the examples.

I claim:

1. The process for preparing $\alpha,\alpha$-dichloropropionaldehyde, $\alpha,\alpha$-dichlorobutyraldehyde or $\alpha,\alpha$-dichlorovaleraldehyde comprising reacting by contacting an aldehyde selected from the group consisting of propionaldehyde, butyraldehyde and valeraldehyde with sulfuryl chloride at a temperature of from about 25° to 40° C. in the presence of diphenyl sulfide, and increasing the temperature thereafter to from about 60° to about 90° C. in an inert liquid organic reaction medium.

2. The process of claim 1 wherein propionaldehyde is reacted.

3. The process of claim 1 wherein butyraldehyde is reacted.

4. The process of claim 1 wherein the temperature is increased to 65° to 85° C. after the addition of the sulfuryl chloride.

References Cited

FOREIGN PATENTS 1,153,746   5/1969   Great Britain _____ 260—658

OTHER REFERENCES

Dick, C. R., J. of Org. Chem., vol. 27, pp. 272–274 (1962).

Brown et al., J.A.C.S., vol. 77, 4019–4024 (1955).

Bing et al., Chem. Abstracts, vol. 55, column 27214c (1961).

LEON ZITVER, Primary Examiner

R. H. LILES, Assistant Examiner